United States Patent [19]

Morini

[11] Patent Number: 5,286,132
[45] Date of Patent: Feb. 15, 1994

[54] ELASTIC JOINT

[75] Inventor: Emilio Morini, Milan, Italy

[73] Assignee: Pirelli Sistemi Antivibranti S.p.A., Milan, Italy

[21] Appl. No.: 711,011

[22] Filed: Jun. 6, 1991

[30] Foreign Application Priority Data

Jun. 14, 1990 [IT] Italy .................. 20647 A/90

[51] Int. Cl.$^5$ .................................................. F16D 3/00
[52] U.S. Cl. ........................................ 403/228; 403/226; 403/225; 403/162
[58] Field of Search .............. 403/225, 224, 228, 226, 403/162, 220, 221, 223, 227; 267/141.1, 294; 105/199.1, 167, 168

[56] References Cited

U.S. PATENT DOCUMENTS

| | | | |
|---|---|---|---|
| 2,482,488 | 9/1949 | Julien | 403/228 X |
| 3,397,584 | 8/1968 | Koch | 403/221 X |
| 4,129,394 | 12/1978 | Eichingert et al. | 403/226 X |
| 4,395,143 | 7/1983 | Bakken et al. | |
| 4,671,694 | 6/1987 | Brenner et al. | 403/228 X |
| 4,772,151 | 9/1988 | Lammers et al. | |
| 5,031,545 | 7/1991 | Bourgeot | 403/228 X |
| 5,033,722 | 7/1991 | Lammers | 403/228 X |

FOREIGN PATENT DOCUMENTS

| | | |
|---|---|---|
| 1650926 | 1/1953 | Fed. Rep. of Germany . |
| 1006248 | 9/1976 | Italy . |
| WO8905921 | 6/1989 | PCT Int'l Appl. . |
| 372205 | 5/1932 | United Kingdom ................ 403/227 |
| 593466 | 10/1947 | United Kingdom . |
| 603642 | 6/1948 | United Kingdom . |
| 606581 | 8/1948 | United Kingdom . |
| 972890 | 10/1964 | United Kingdom . |

Primary Examiner—Randolph A. Reese
Assistant Examiner—Harry C. Kim
Attorney, Agent, or Firm—Stevens, Davis, Miller & Mosher

[57] ABSTRACT

A joint is described which has a pair of coaxially aligned elastic rings (5) of truncated conical form the respective vertices of which are directed in opposite ways and are engaged each between a central core (3) externally having an attachment surface (3a) of truncated conical form and an outer collar (4) internally having an attachment surface (4a) of truncated conical form converging towards a vertex (V) which is common to the converging vertex of the attachment surface (3a) of the core (3).

Each elastic ring (5) comprises an inner layer made of elastomeric material (10) and an outer layer (11) made of elastomeric material between which a laminar insert piece of truncated conical form (12) is inserted, the inner (12a) and outer (12b) surfaces of which converge towards the common vertex (V) of the attachment surfaces (3a, 4a).

The outer elastomeric layer (11) is greater in thickness that the inner elastomeric layer (10).

The described joint (1) has an improved fatigue limit.

15 Claims, 3 Drawing Sheets

ELASTIC JOINT

BACKGROUND OF THE INVENTION

The present invention relates to an elastic swivel, of the type having at least a spring connection member comprising:
- a central core external having an attachment surface of truncated conical form;
- an outer collar disposed coaxially about the central core and internally provided with an attachment surface of truncated conical form the vertex of which is oriented in the same direction as the vertex of the attachment surface of the core;
- at least one elastic ring made of elastomeric material, having the form of a truncated cone and being rigidly engaged between the outer frusto-conical surface of the core and the inner frusto-conical surface of the collar.

The elastic swivel in question can be widely used in many fields of the mechanical industry, such as for example in the manufacture of suspensions for road and railway vehicles and/or in any situation in which the necessity arises of connecting two members or parts of a machinery susceptible of mutual oscillations in different directions.

In particular, in the course of the present description reference will be made, by way of example only, to the application of the elastic swivel to suspensions for bogies in the railway field.

It is known that when it is necessary to connect two members of a machine or apparatus giving them the possibility of mutual oscillation elastic swivels are often used which essentially consist of one or more spring connection members, each of which comprises a central core externally having an attachment surface of truncated conical form, an outer collar provided with an inner attachment surface of truncated conical form the tapering of which is equal to that of the attachment surface in the core, as well as a ring made of elastomeric material, of truncated conical form too, connected to the attachment surfaces of the core and collar by a rubber-metal junction process.

The parts that, must be mutually connected by the above describe swivel and are engaged to the central core and outer collar respectively, will be able to elastically oscillate according to different directions.

In more detail, the possible elastic oscillations in the different directions are classified according to four different types:
- axial oscillations;
- radial oscillations;
- rotational oscillations about the geometric axis of the joint;
- huntings about an axis perpendicular to the geometric axis of the joint.

By choosing each time different construction solutions it is possible to impart more or less elasticity to the joint depending upon requirements, in connection with one or more of the above listed oscillation types.

For example, in making a swivel it is common to couple two connection members which are disposed coaxially and in mirror image relationship in order to balance the elastic behavior thereof in the two ways of the axial oscillation direction.

It is also known from the Italian Patent No. 1,006,248 to manufacture an elastic joint in such a manner that, after the assembling, the elastic ring or rings provided therein are precompressed between the central core and the outer collar.

This construction solution is normally adopted in order to reduce the ratio value between the radial stiffness and axial stiffness in the joint.

The behavior of the joint in the different oscillation directions can also be established, within some parameters, by the choice of suitable shapes and sizes of the elastic ring or rings interposed between the core and the outer collar.

It is however to be pointed out that at the present state of the art serious difficulties are encountered in the manufacture of elastic swivels offering a satisfactory behavior and in particular a high fatigue limit in connection with huntings.

In fact it has been found that when an elastic swivel is particularly stressed by this type of oscillation, it undergoes fatigue yieldings that usually result in the separation of the rubber ring from the core and/or outer collar at the edges defining the major base of the frusto-conical configuration of the ring itself.

SUMMARY OF THE INVENTION

The main object of the present invention is substantially to solve-the above problem and therefore provide an elastic swivel having an excellent fatigue limit, above all as far as huntings are concerned.

A further object of the invention is to provide biconical swivels which, in addition to a high hunting strength, have a high radial stiffness together with a uniform distribution of stresses on the elastomeric material so as to prevent the most stressed elastomeric areas from giving rise to premature yield due to fatigue.

The foregoing and further objects that will become more apparent in the course of the present description are substantially attained by an elastic swivel, characterized in that the outer frusto-conical surface of the core and the inner frusto-conical surface of the collar converge into a common vertex.

BRIEF DESCRIPTION OF THE DRAWINGS

Further features and advantages will be best understood from the detailed description of a preferred embodiment of an elastic swivel in accordance with the invention, given hereinafter by way of non-limiting example with reference to the accompanying drawings, in which.

DETAILED DESCRIPTION OF PREFERRED EMBODIMENTS

Figure 1:
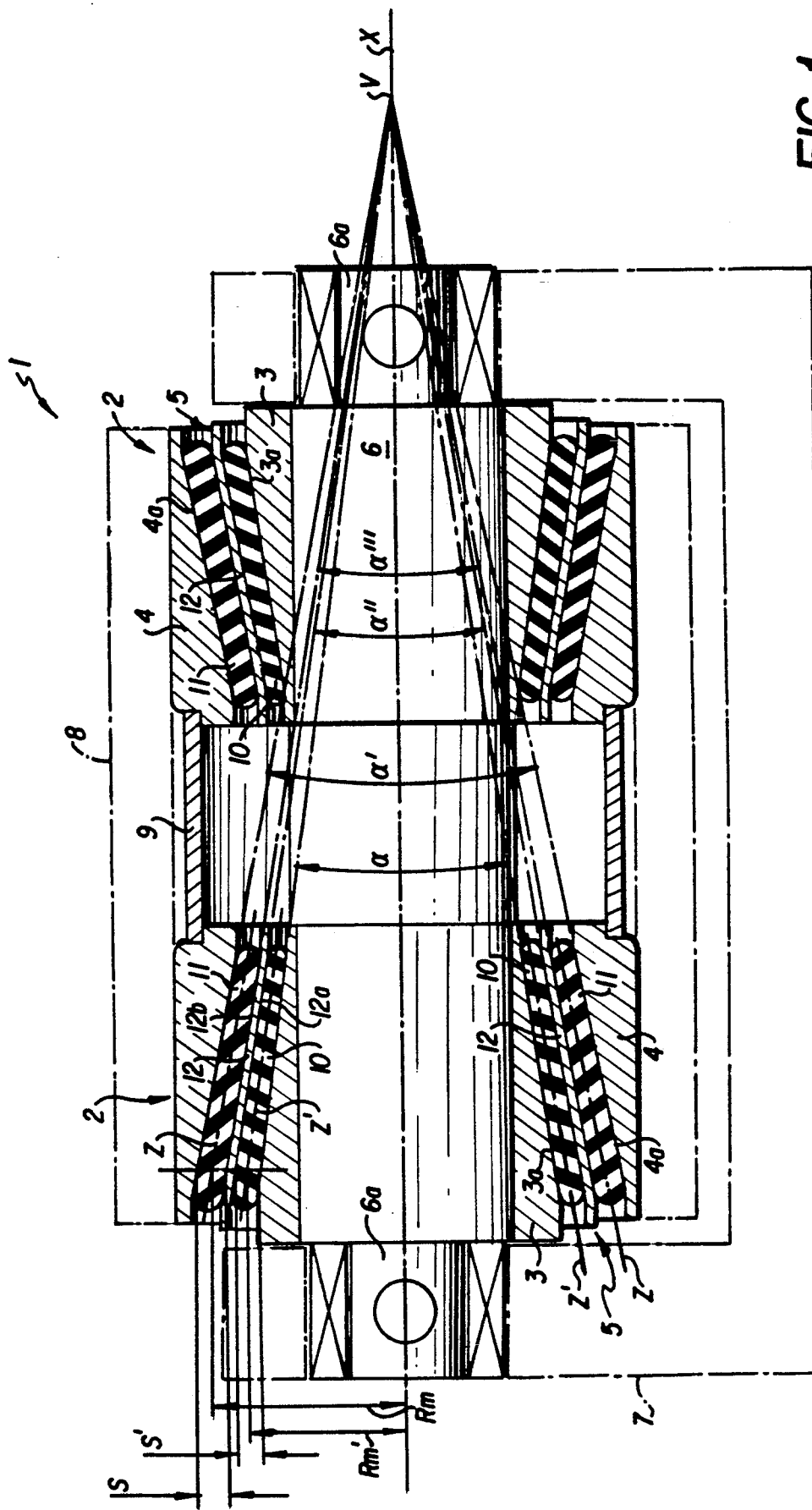
FIG. 1 is a Diametrical sectional view of an elastic swivel in accordance with the invention, having two spring connection members disposed in mirror image relationship.

Referring to the drawings and in particular to FIG. 1, an elastic swivel in accordance with the invention has been generally identified by reference numeral 1.

The elastic swivel 1 is conventionally provided with at least one spring connection member 2 comprising a central core 3 provided with an outer attachment surface 3a of truncated conical form, an outer collar 4 having an inner attachment surface 4a of truncated conical form oriented in the same direction as the attachment surface 3a of core 3, and at least an elastic ring 5 of truncated conical form as well, rigidly engaged between the attachment surface 3a of core 3 and the attachment surface 4a of collar 4.

In the example shown in FIG. 1 the elastic swivel 1 is foreseen as being provided with a pair of coaxially aligned spring connection members 2 disposed in mirror image relationship, so that the respective elastic rings 5 converge towards each other.

Figure 5:
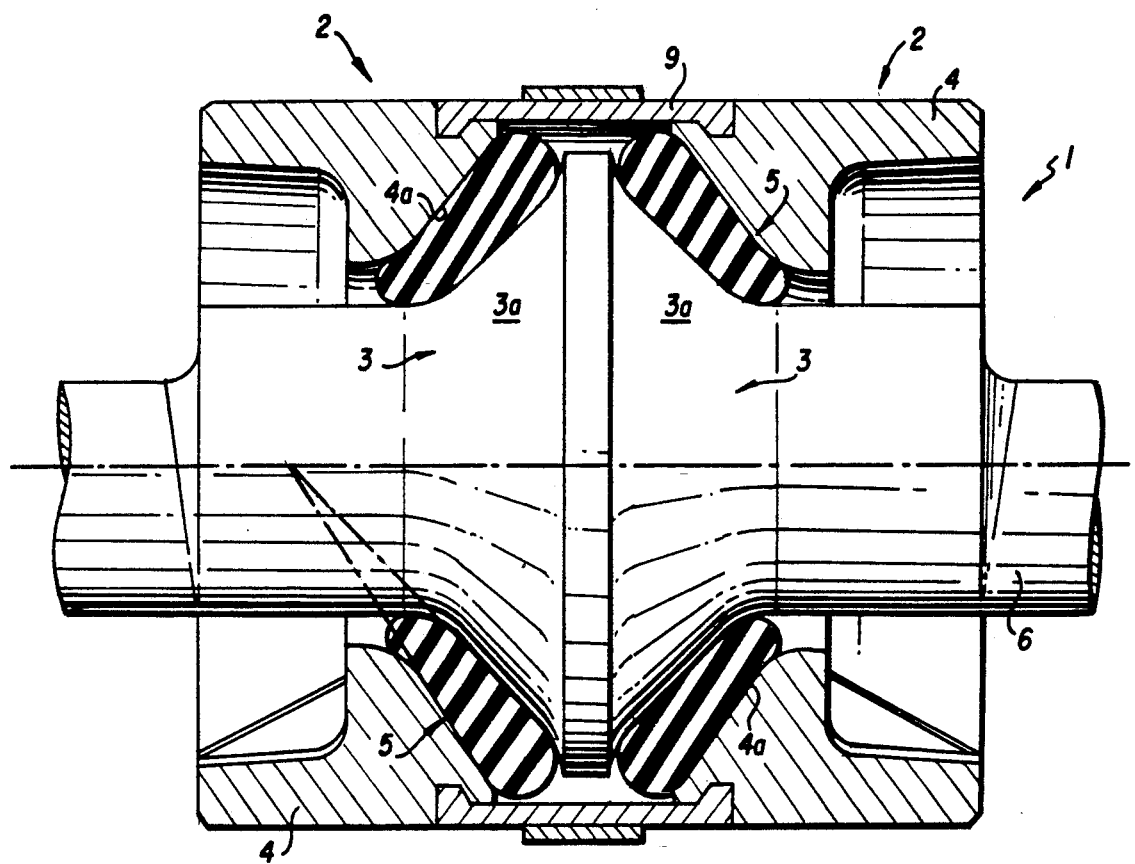
FIG. 5 is a further embodiment of the invention.

Obviously the spring connection members 2 can also be disposed in a reverse position with respect to FIG. 1, that is in such a manner that the respective elastic rings 5 converge away from each other, as shown in FIG. 5 for example.

The central cores 3 of both connecting members 2 are coaxially engaged on a centering gudgeon 6 provided, at the respective opposite ends, with two attachment extensions 6a carrying, operatively engaged thereon, one part of any structure with which the elastic joint 1 is associated.

Said first structure part is only diagrammatically shown in dotted line and identified at 7.

Still in a known manner, interposed between the outer collars 4 which are engaged by a second part 8 of said structure, is a sleeve or annular spacer 9 the axial extension of which is greater than the mutual distance between the outer collars 4 when the spring connection members 2 are in a free state.

In other words, the engagement of the annular spacer 9 between the outer collars 4 takes place after the collars are mutually and forcedly moved apart from each other by suitable means, so that, when assembly is completed, the elastic ring 5 of each connection member 2 is precompressed between the attachment surface 3a of core 3 and the attachment surface 4a of collar 4.

In the example shown in FIG. 5 two sleeves or stiff half-rings 9 provided with means for the engagement to the collars are foreseen in order to cause the mutual approaching thereof and consequently the precompression of the elastic ring between the attachment surface 3a of the core and the attachment surface 4a of the collar.

The two half-rings are moved close to each other by suitable means, for example a press, and are joined by the outer annular element shown in the figure.

Advantageously, in accordance with a main feature of the present invention, advantageously in each of the spring connection members 2 the attachment surfaces 3a, 4a of the core 3 and collar 4 should be oriented so as to converge towards the common vertex "V". Preferably the common vertex lies on the geometrical axis "X" of the elastic swivel 1, and is the centre about which huntings take place between the structure parts 7, 8 mutually connected by the joint itself.

To this end, the tapering of the attachment surface 3a of core 3 is provided to correspond to a vertex angle "α" ranging between 14° and 18°, in the example shown equal to 16°26', whereas the tapering of the attachment surface 4a of collar 4 corresponds to a vertex angle "α'", ranging between 20° and 24°, in the example shown equal to 22°12'.

In accordance with a further feature of the present invention, each spring ring 5 comprises an inner layer 10 made of elastomeric material joined to the attachment surface 3a of core 3, an outer layer 11 of elastomeric material joined to the attachment surface 4a of collar 4 and a stiff laminar insert piece 12 of truncated conical form, the inner surface 12a of which is joined to the inner elastomeric layer 10 and the outer surface 12b of which is joined to the outer elastomeric layer 11.

The engagement of the inner and outer layers 10, 11 with the core 3, collar 4 and laminar insert piece 12 is preferably achieved by a conventional rubber-metal junction process.

Advantageously, the inner and outer surfaces 12a and 12b of the laminar insert piece 12 also converge into the previously mentioned common vertex "V".

To this end, in the example shown said inner and outer surfaces 12a and 12b are provided to have a tapering shape defined by respective vertex angles "α''''", "α'''''" of a value in the range of 16° to 20°, the vertex angle "α'''''", of the outer surface 12b being slightly greater than the vertex angle "α''''" of the inner surface 12a.

In the embodiment shown the vertex angle "α'''''" is equal to 19°, whereas the vertex angle "α''''" is substantially equal to 18°.

Still in accordance with the present invention, as can be easily viewed from FIG. 1, the outer elastomeric layer 11 is provided to have a thickness "s" greater than the thickness "s'" of the inner elastomeric layer 10.

More specifically, the thickness of each inner and outer elastomeric layer 10, 11 is proportional, at any point of the longitudinal extension of the elastic ring 5, to the mean radius "Rm", "Rm'" of the elastomeric layer itself.

As can be easily seen in FIG. 1, by mean radius it is meant the distance between axis "X" of the elastic swivel 1 and the centre lines "Z", "Z'" of the thickness of the respective elastomeric layer 10, 11.

In the same manner as in conventional elastic swivels during the operation of the elastic swivel 1 the elastic rings 5 lend themselves to be elastically deformed in order to absorb stresses and relative displacements between the parts 7, 8 which are mutually connected by the swivel itself.

In particular, joint 1 can absorb axial stresses, radial stresses and torsion stresses about axis "X" as well as hunting stresses substantially occurring about the previously described common vertex "V".

It has been found that in the presence of the innovative solutions proposed in the present invention, an important improvement in the fatigue limit of the elastic swivel 1 has been reached, especially in regards to hunting stresses.

In greater detail, it has been found that the lifetime of the swivel in question when submitted to fatigue hunting stresses exceeds the lifetime of the elastic swivels made in accordance with the known art by 5 to 10 times.

The reasons for such an important improvement are not yet completely known to those skilled in the art. The improvement as regards hunting fatigue limit is believed to be due to different factors on the basis of which several theoretical explanations have been given.

Figure 2:
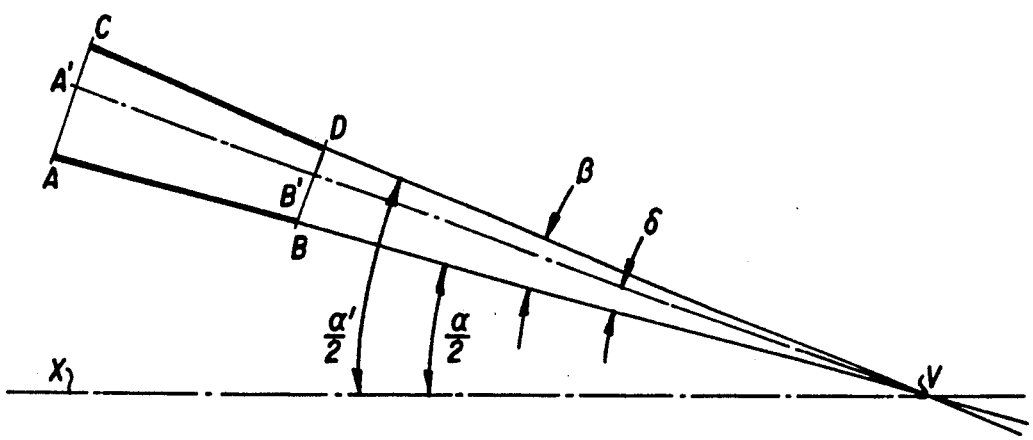
FIG. 2 is a geometric diagram showing, in connection with a hunting, the mutual approaching between the core and the outer collar in a spring connection member provided in the present swivel.
Figure 3:
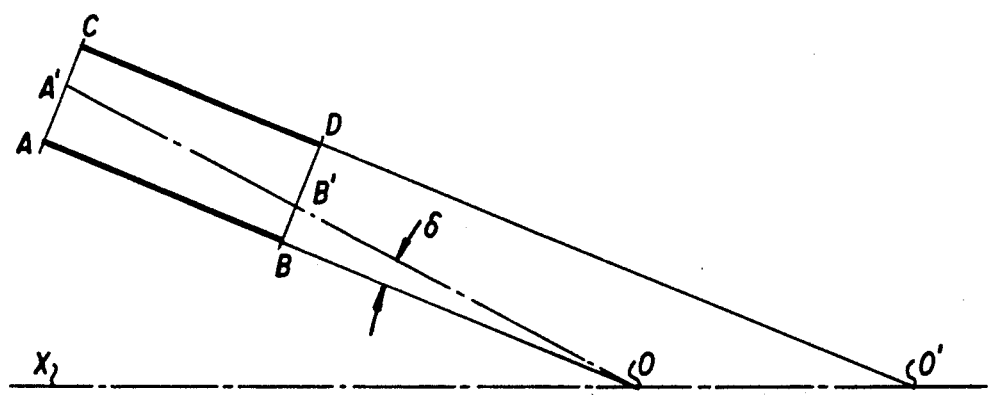
FIG. 3 is a geometrical diagram similar to the one shown in FIG. 2 but referred to an elastic swivel of the known art.

Described hereinafter with reference to FIGS. 2 and 3 are the operational aspects which, in the applicant Is opinion, mostly affect the improvement of the fatigue limit in the joint in question.

In said figures, referring to the operational behaviour of the joint of the invention (FIG. 2) and of a conventional joint (FIG. 3) respectively, the generating lines of the attachment surface 3a of the central core 3 and the attachment surface 4a of the outer collar 4 have been diagrammatically shown by segments AB and CD respectively. The relative positioning between said generating lines and axis "X" of the elastic joint 1 is also shown.

As can be seen from FIG. 3, the generating lines AB and CD of the joint in accordance with the known art are disposed parallel to each other, and their extensions, represented by a thin line, meet axis "X" at two mutually spaced apart points "O" and "O'". When the elastic joint is submitted to a hunting stress, segment AB approaches segment CD by rotating about the convergency point "O" on axis "X" according to a determined angle referenced by δ.

The position taken by segment AB has been shown by segment A'B' represented in chain dot line.

As can be easily understood, during the oscillation of segment AB, point A describes an arc AA' the opening of which is expressed by equation:

$$AA' = \delta R$$

where R is the distance between point A and point O.

Point B, on the contrary, describes an arc BB' the opening of which corresponds to equation:

$$BB' = \delta R/n$$

where n is the ratio value between distance R and the distance between point B and point O.

From the foregoing it appears that, as arc AA' has a greater length than arc BB', the distance $$A'C = AC - AA'$$

will be much lower than distance $$B'D = BD - BB'.$$

As a result the elastomeric material interposed between the surfaces represented by segments AB and CD will be subjected to undergo, close to points A and C, much higher deformations than those which can be found close to points B and D.

Those anomalous deformations in conventional joints impairs the fatigue limit under the effect of huntings which, in a short time, give rise to a detachment of the elastomeric rings from the respective attachment surfaces in the areas corresponding to points A and C.

Referring now to FIG. 2, in the elastic joint in question segments AB and CD converge into the common vertex "V" lying on axis "X". In a rest condition point A and point C are spaced apart from each other according to an arc:

$$AC = \beta R$$

where:

R corresponds to the distance of point "V" from points A and C;

β is an angle of a value corresponding to half the difference between the above angles a and a'.

Points C and D, on the contrary, are spaced apart from each other according to an arc:

$$BD = \beta R/n$$

where n is the ratio value between distance R and the distance between point "V" and points B and D.

In the same manner as in the case shown in FIG. 3, when the elastic joint 1 is submitted to hunting stresses, segment AB comes close to segment CD by rotating about point "V".

In this case too the new position taken by segment AB is represented by segment A'B' shown in interrupted line.

While segment AB is being moved, point A describes an arc AA' the opening of which corresponds to:

$$AA' = \delta R$$

whereas point B describes an arc the opening of which is equal to:

$$BB' = \delta R/n.$$

By calculating the ratio between arc AC and arc AA' it appears that:

$$AC/AA' = \beta R/\delta R = \beta/\delta$$

Likewise, by examining the ratio between the distance BD and distance BB' it appears that $$BD/BB' = R/n\beta/R/n\ \delta = \beta/\delta$$

From the above relations it appears immediately that the percent deformations of the elastomeric material interposed between the attachment surfaces represented by segments AB and CD are identical at all points of the longitudinal extension of the elastic ring.

As a consequence, there is uniformity in deformations, and therefore in stresses, which results in an important increase in the fatigue limit of the joint.

A further increase of the fatigue limit is achieved by adopting elastic rings 5 formed with the two layers 10, 11 of elastomeric material separated by the laminar insert piece 12 and preferably having differentiated thicknesses.

The optimal result thus achieved could be explained in a hypothetical manner by the fact that as the first elastomeric layer 10, extends internally to the second layer 11, it is fixed to the central core 3 and the laminar insert piece 12 according to surfaces which are not as wide as those which can be found with reference to the second layer 11.

Therefore, under the effect of the radial load which is transmitted unchanged, the first elastomeric layer 10 would be submitted to specific pressures which are higher than those of the second layer 11. Should the thickness of the two layers be equal, the first elastomeric layer would consequently undergo greater deformations than the second layer 11. Practically the second layer is too stiff.

Advantageously, by imparting a greater thickness to the second layer 11 than to the first layer 10, a reduction in the elastic stiffness of the second layer is achieved and this reduction exactly compensate for the difference between the specific pressures that can be found in the two layers 10, 11 so that the latter can undergo identical percent deformations, when stresses are identical.

Figure 4:
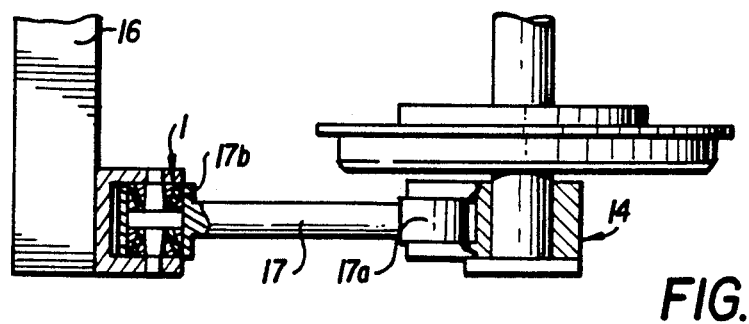
FIG. 4 is a fragmentary diagrammatic top view partly in section showing the application of an elastic swivel in accordance with the invention to the suspensions of a railway vehicle, given by way of example.

Shown in FIG. 4 is an example of the application of an elastic joint produced in accordance with the present invention.

In the example shown a bogie 14 of a railway vehicle is provided to be connected to the vehicle body 16 by a connecting rod 17 the opposite ends 17a, 17b of which are respectively fastened to the bogie 14 and body 16.

Advantageously, the connection of at least one of the ends 17a, 17b of the connecting rod to the respective part of the railway vehicle takes place by an elastic joint manufactured in accordance with the present invention.

In greater detail, in the example shown the end 17b of the connecting rod 17 is fastened to the body 16 by an elastic joint 1 similar to the swivel shown in FIG. 1.

The swivel 1 is capable of absorbing the high radial stresses due to the stopping conditions of the bogie.

In addition, in some applications swivel 1 represents the only element capable of elastically resisting the axial and hunting stresses resulting from the movement of the bogie when it is bending at high speed.

The invention attains the intended purposes.

It will be apparent from the foregoing description that the innovative solutions adopted in the joint of the invention are capable of greatly increasing its fatigue limit, as compared with joints of the known art. It will be also recognized that the important increase in the fatigue limit is achieved by simple expedients which do not greatly weigh on the manufacture costs of the joint.

Obviously many modifications and variations can be made to the invention as conceived, all of them falling within the scope of the inventive idea characterizing it.

For example the two surfaces 12a and 12b of the laminar insert piece 12 could be parallel to each other instead of converging, as shown and described with reference to FIG. 1.

In that solution the two surfaces defining the elastomeric layer 10 have one converging point on axis "X" and the two surfaces defining the elastomeric layer 11 have a second converging point spaced apart from the first point on axis "X".

The considerations of FIG. 2 can be repeated for both layers 10 and 11.

I claim:

1. An elastic swivel comprising:
   a central core having two axially spaced apart ends, and having thereon two external attachment surfaces of truncated conical form;
   two axially spaced apart outer collars having ends facing each other and disposed coaxially about the central core and having respective internal attachment surfaces of truncated conical form the vertex of which is axially directed as the vertex of the external attachment surface of the core;
   two elastic rings made of elastomeric material, of truncated conical form and rigidly engaged between the external attachment surfaces of the core and the internal attachment surfaces of the outer collars;
   a sleeve having an axial length which is different by a predetermined value from the axial distance between said two facing ends of the two outer collars and means for mounting the sleeve to said facing ends as a result of an axial translation of said two outer collars, the degree of which makes the distance between said facing ends equal to the axial length of said sleeve, characterized in that the external attachment surface of the core and the corresponding internal attachment surface of the collar converge towards a common vertex V and in which each of said elastic rings comprises an inner layer made of elastomeric material joined to the external attachment surface of said core, an outer layer made of elastomeric material joined to the internal attachment surface of said collar and a stiff laminar insert piece of truncated conical form having (a) an inner surface which is joined to said elastomeric inner layer and (b) an outer surface which is joined to said elastomeric outer layer with the elastomeric outer layer being of greater thickness than the elastomeric inner layer.

2. An elastic swivel according to claim 1, in which the surfaces defining said inner layer converge towards one point on a geometrical axis "X" of the joint and the surfaces defining said outer layer converge towards a second point on the geometrical axis "X" of the joint.

3. An elastic swivel according to claim 1 in which said inner and outer surfaces of said stiff laminar insert piece converge toward said common vertex V.

4. An elastic swivel according to claim 1 in which said common vertex V lies on a geometric central axis of the elastic swivel.

5. An elastic swivel having at least one spring connection member comprising:
   a central core have an external attachment surface of truncated conical form;
   an outer collar disposed coaxially about the central core and having an internal attachment surface of truncated conical form, the external attachment surface of the central core and the internal attachment surface of the outer collar converging towards a common vertex V;
   at least one elastic ring made of elastomeric material, having the form of a truncated cone and rigidly engaged between the external attachment surface of the core and the internal attachment surface of the collar;
   said elastic ring being formed by (a) an inner layer made of elastomeric material joined to the external attachment surface of said core, (b) and outer layer made of elastomeric material joined to the internal attachment surface of said outer collar, and (c) a stiff laminar insert piece of truncated conical form, having an inner surface which is joined to said inner elastomeric layer and having an outer surface which is joined to said outer elastomeric layer;
   the inner and outer surfaces of said stiff laminar insert piece converging towards said common vertex V; and said outer elastomeric layer having a thickness greater than a thickness of said inner elastomeric layer.

6. An elastic swivel according to claim 5 including a pair of spring connection members which are coaxially aligned and have their respective elastic rings positioned in opposite axial direction with respect to each other.

7. An elastic swivel according to claim 6 in which said elastic rings are positioned to converge toward each other.

8. An elastic swivel according to claim 6 in which said elastic rings are positioned to converge away from each other.

9. An elastic swivel according to claim 5 in which said common vertex V lies on a geometric central axis of the elastic swivel.

10. An elastic swivel according to claim 5 in which said common vertex V is the center about which oscillations of the hunting type take place between the central core and the outer collar.

11. An elastic swivel according to claim 5 in which the thickness of said inner and outer elastomeric layers is proportional to a mean radius of said layers.

12. An elastic swivel according to claim 5 in the external attachment surface of the central core is tapered at an angle of 14° to 18° with respect to a central axis of said swivel.

13. An elastic swivel according to claim 5 in which the internal attachment surface of the outer collar is tapered at an angle of 20° to 24° with respect to a central axis of said swivel.

14. An elastic swivel according to claim 5 in which the inner and outer surfaces of the laminar insert piece is tapered at an angle of 16° to 20° with respect to a central axis of said swivel.

15. An elastic swivel according to claim 5 in which said elastic ring is interposed between the central core and the outer collar under elastic precompression conditions.

* * * * *